(12) United States Patent
Michalewicz et al.

(10) Patent No.: US 7,706,355 B2
(45) Date of Patent: *Apr. 27, 2010

(54) SYSTEM AND METHOD FOR CONVERTING PACKET PAYLOAD SIZE

(75) Inventors: Larry G. Michalewicz, Allen, TX (US); Ronald D. Higgins, The Colony, TX (US)

(73) Assignee: Cisco Technology, San Jose, CA (US)

( * ) Notice: Subject to any disclaimer, the term of this patent is extended or adjusted under 35 U.S.C. 154(b) by 1252 days.

This patent is subject to a terminal disclaimer.

(21) Appl. No.: 11/234,444

(22) Filed: Sep. 22, 2005

(65) Prior Publication Data

US 2006/0018307 A1    Jan. 26, 2006

Related U.S. Application Data

(63) Continuation of application No. 09/449,185, filed on Nov. 24, 1999, now Pat. No. 6,961,346.

(51) Int. Cl.
*H04L 12/66* (2006.01)
(52) U.S. Cl. ............................. 370/352; 370/465
(58) Field of Classification Search ................. 370/487, 370/466, 465, 468, 474, 498, 537, 400, 401, 370/394, 528, 442, 352
See application file for complete search history.

(56) References Cited

U.S. PATENT DOCUMENTS

| | | | |
|---|---|---|---|
| 6,175,573 B1 | 1/2001 | Togo et al. | 370/474 |
| 6,233,253 B1 | 5/2001 | Settle et al. | 370/474 |
| 6,266,343 B1 * | 7/2001 | Caves | 370/466 |
| 6,351,471 B1 * | 2/2002 | Robinett et al. | 370/468 |
| 6,438,137 B1 | 8/2002 | Turner et al. | 370/466 |
| 6,490,286 B1 | 12/2002 | Ono et al. | 370/395.31 |
| 6,574,191 B1 | 6/2003 | Usukura et al. | 370/216 |
| 6,584,070 B1 | 6/2003 | Takashima et al. | 370/232 |
| 6,594,267 B1 | 7/2003 | Dempo | 370/395.64 |
| 6,603,739 B1 * | 8/2003 | Dubuc | 370/232 |
| 6,614,808 B1 * | 9/2003 | Gopalakrishna | 370/469 |
| 6,621,514 B1 * | 9/2003 | Hamilton | 348/14.09 |
| 6,621,821 B1 | 9/2003 | Song | 370/395.6 |
| 6,639,916 B1 | 10/2003 | Wakizaka | 370/397 |
| 6,721,334 B1 * | 4/2004 | Ketcham | 370/473 |
| 6,735,190 B1 * | 5/2004 | Chuah et al. | 370/352 |
| 7,088,710 B1 * | 8/2006 | Johnson et al. | 370/357 |

OTHER PUBLICATIONS

Cisco Systems, Inc.; "System Description for the Cisco Communications Network Version 2.1;" Cisco Communications Network; all, 1997.

* cited by examiner

*Primary Examiner*—Brian D Nguyen
(74) *Attorney, Agent, or Firm*—Baker Botts L.L.P.

(57) ABSTRACT

An apparatus is provided for enabling communication between telephony devices. The apparatus includes a queue operable to receive incoming media packets from the telephony devices, and a payload segmenter coupled to the queue and operable to divide an incoming payload section of each incoming packet into one or more data segments. The apparatus also includes a mixer coupled to the payload segmenter and operable to mix the data segments from the telephony devices to create an aggregate data segment. Furthermore, the apparatus includes a reassembly buffer coupled to the mixer and operable to construct an outgoing payload section for one or more telephony devices by linking successively generated aggregate data segments.

40 Claims, 4 Drawing Sheets

US 7,706,355 B2

SYSTEM AND METHOD FOR CONVERTING PACKET PAYLOAD SIZE

CROSS REFERENCE TO RELATED APPLICATIONS

This application is a continuation of U.S. application Ser. No. 09/449,185 filed Nov. 24, 1999 and entitled "System and Method for Converting Packet Payload Size" issued Nov. 1, 2005 as U.S. Pat. No. 6,961,346.

TECHNICAL FIELD OF THE INVENTION

This invention relates generally to the field of networking, and more specifically to a system and method for converting packet payload size.

BACKGROUND OF THE INVENTION

Historically, telecommunications have involved the transmission of voice, fax and encoded data signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses this existing technology to transmit voice and fax signals by converting these signals into digital data for transmission over an IP network.

Although integrating telecommunications into existing data networks provides many advantages, this new technology also presents some problems due to a lack of common standards. One such problem arises when a telephony device transmits IP packets having a different payload size than the payload size used by other telephony devices on the network.

SUMMARY OF THE INVENTION

In accordance with the present invention, a system and method for converting packet payload size is provided that substantially eliminates or reduces disadvantages or problems associated with previously developed systems and methods. In particular, the present invention contemplates a bridge that receives incoming packets having a first payload size and outputs packets having a second payload size. Furthermore, different sized payloads from different telephony devices can be converted to a common size for mixing, and the mixed payloads can then be reconverted to the payload size received from each telephony device for transmission back to the telephony device.

In one embodiment of the present invention, an apparatus is provided for enabling communication between telephony devices. The apparatus includes a queue operable to receive incoming media packets from the telephony devices, and a payload segmenter coupled to the queue and operable to divide an incoming payload section of each incoming packet into one or more data segments. The apparatus also includes a mixer coupled to the payload segmenter and operable to mix the data segments from the telephony devices to create an aggregate data segment. Furthermore, the apparatus includes a reassembly buffer coupled to the mixer and operable to construct an outgoing payload section for one or more telephony devices by linking successively generated aggregate data segments. In another embodiment of the present invention, a method is provided for enabling communication between telephony devices. The method includes receiving incoming media packets from each telephony device, and dividing an incoming payload section of each incoming media packet into one or more data segments. The method further includes mixing the data segments to create an aggregate data segment and constructing an outgoing payload section for one or more of the telephony devices by linking successively generated aggregate data segments.

Technical advantages of the present invention include a system and method for converting the payload size of packets received from a telephony device. For example, the payload size of packets from a telephony device may be converted to a different payload size for transmission to one or more other telephony devices. Alternatively, the payload size of packets received from more than one telephony device may be divided into segments of a common size to allow the payloads from the telephony devices to be mixed to enable a conference call. Once the commonly sized segments are mixed, the aggregate segments are used to construct payloads of a size appropriate for each of the telephony devices. Furthermore, the aggregate segments can be used to create payloads for a telephony device that is not participating in the conference call. This feature allows such a telephony device to silently monitor the conference call. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
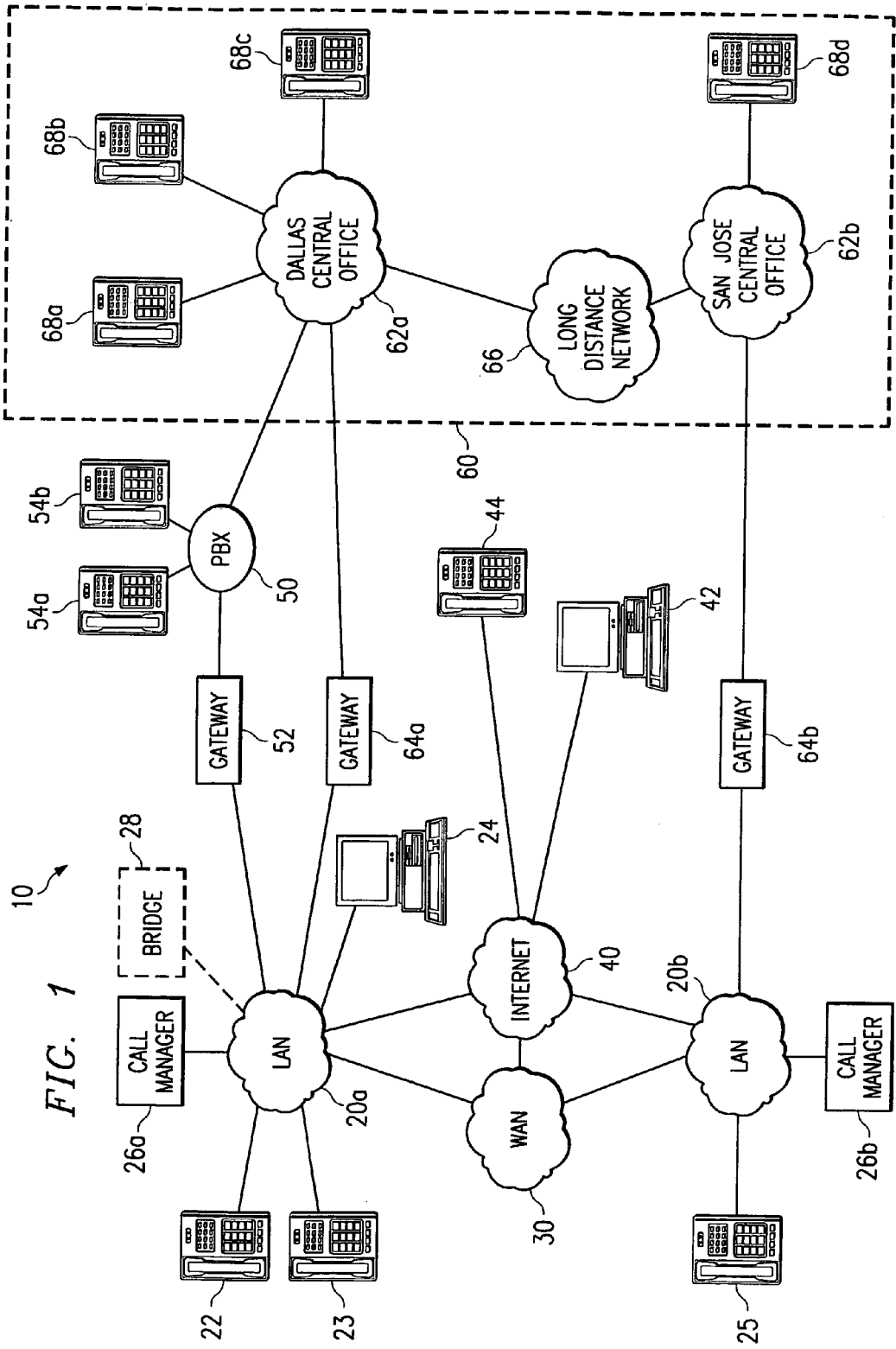
FIG. 1 illustrates an exemplary communication network in accordance with one embodiment of the present invention.

FIG. 1 illustrates an exemplary communication network 10. In the illustrated embodiment, communication network 10 includes a plurality of local area networks (LANS) 20 interconnected using a wide area network (WAN) 30. Each LAN 20 is a computer data network that is further operable to transmit audio and/or video (media) telecommunication signals. In the particular embodiment illustrated in FIG. 1, LANs 20 are Internet Protocol (IP) networks. However, LANs 20 may be any type of network that allows the transmission of media telecommunications, as well as traditional data communications. Therefore, although subsequent description will primarily focus on IP telephony devices, it should be understood that other appropriate telephony devices, such as Voice over Frame Relay devices, are also included within the scope of this description. Furthermore, although a specific communication network is illustrated in FIG. 1, the term "communication network" should be interpreted as generically defining any network capable of transmitting data and telecommunication signals.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateways. For example, LAN 20a is coupled to a private branch exchange (PBX) 50 through a gateway 52. PBX 50 represents the analog and/or digital telephone systems typically used by businesses. PBX 50 includes a plurality of extension telephones (or subscriber sets) 54a and 54b to which PBX 50 directs incoming telephone calls. Gateway 52 may be either an analog or a digital gateway depending on the type of PBX 50 to which it is coupled. The operation of the gateways in communication network 10 is described in further detail below.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunications equipment that are located across the country. For example, central offices (COs) 62 connect telephone customers, such as residences and businesses, to PSTN 60. In the illustrated embodiment, LANs 20 are coupled to selected central offices 62 through the use of gateways 64, described below. Central offices 62 are coupled through a long distance network 66 that allows communication between residences and businesses coupled to central offices 62 in different areas, such as CO 62a in Dallas or CO 62b in San Jose.

IP networks transmit data (including voice and video data) by placing the data in packets and sending each packet to the selected destination. The technology that allows telecommunications to be transmitted over an IP network may be referred to as Voice over IP (VoIP). IP telephony devices 22-24 are coupled to LAN 20a to allow such communication over LAN 20a. IP telephony devices 22-24 have the capability of encapsulating a user's voice (or other media inputs) into IP packets so that the media can be transmitted over LAN 20a, WAN 30 and/or Internet 40. IP telephony devices may include telephones, fax machines, computers running telephony software (such as MICROSOFT NETMEETING), analog or digital gateways, or any other device capable of performing telephony functions using an IP network.

An IP telephony device may resemble a traditional digital PBX telephony device, but instead of connecting to a proprietary PBX port, the IP telephony device plugs into a LAN jack, such as an Ethernet jack. Alternatively, a user may plug a handset, headset, microphone and/or speakers directly into a personal computer 24 on LAN 20 to form an IP telephony device. An IP telephony device operates as a standard IP network device and typically has its own IP address (which may be assigned dynamically). IP telephony devices may have the ability to handle data coding and decoding at the telephony device. This feature allows the telephony device to switch encoding schemes on demand, such as switching between G.711 and G.723 encoding.

A call manager 26a controls IP telephony devices 22-24 (a similar call manager 26b may be located on LAN 20b). Call manager 26a is an application that controls call processing, routing, telephone features and options (such as call hold, call transfer and caller ID), device configuration, and other telephony functions and parameters within communication network 10. Call manager 26a can control all of the IP telephony devices on LAN 20a, and it may also control IP telephony devices located across WAN 30. For example, call manager 26a is capable of controlling telephony devices on LAN 20b. Thus, call manager 26b may be eliminated entirely or used as a redundant controller.

When a user wishes to place a call from one IP telephony device on LAN 20a to another IP telephony device on LAN 20a (an intra-LAN call), the originating telephony device transmits a signal to call manager 26a indicating the desired function and the telephony device to be called. Call manager 26a then checks on the availability of the target telephony device and, if available, sets up the call by instructing the originating telephony device to establish a media stream with the target telephony device. The initial signaling between call manager 26a and either the originating telephony device or the target telephony device is transmitted over LAN 20a (and, if necessary, WAN 30) using a communication protocol, such as the Transmission Control Protocol (TCP).

The TCP layer in the transmitting telephony device divides the data to be transmitted into one or more packets, numbers the packets, and then forwards them to the IP network layer for transmission to the destination telephony device. Although each packet has the same destination IP address, the packets may travel along different paths to reach the intended destination. As the packets reach the destination telephony device, the TCP layer in the destination telephony device reassembles the individual packets and ensures that they all have arrived. Once TCP reassembles the data, it forwards the data to the appropriate application or other software module in the destination telephony device as a single message.

After call manager 26a initiates the call with signaling over TCP, a codec (coder/decoder) converts the voice, video or fax signals generated by the users of the telephony devices from analog voice signals into digital form. The codec may be implemented either in software or as special-purpose hardware in IP telephony devices 22-24. In the case of an IP telephone, as the user speaks into the handset, the codec converts the analog voice signals into digital data. The digitally encoded data is then encapsulated into IP packets so that it can be transmitted over LAN 20a.

This encapsulation may be performed by Real-Time Transport Protocol (RTP) running over User Datagram Protocol (UDP), or any other suitable communication protocols. As with TCP, UDP uses the Internet Protocol to get data packets from one device to another. Unlike TCP, however, UDP does not provide sequencing and error-checking of the arriving packets. However, since UDP does not perform these functions, UDP operates faster than TCP and is useful when speed is more important than accuracy. This is true of media streaming since it is critical that the data be transmitted as quickly as possible, but it is not critical that every single packet is reassembled correctly (either its absence is negligible or its content can be extrapolated by the destination telephony device). Once UDP has received and reassembled the IP packets at the destination telephony device, a codec in the destination telephony device translates the digital data into analog audio and/or video signals for presentation to the user. The entire process is repeated each time that any call participant (or any other source) generates an audio, video, or fax signal.

In addition to intra-LAN calls, calls can also be placed to and received from non-IP telephony devices 54, 68 that are connected to PBX 50 or PSTN 60. Such calls are made through a gateway 52, 64. Because gateway 52 performs similarly to gateways 64, only gateways 64 will be discussed in further detail. Each gateway 64 converts analog or digital circuit-switched data transmitted by PSTN 60 to packetized data transmitted by LAN 20, and vice-versa. When media packets are transmitted from LAN 20, gateway 64 retrieves the data contained in the incoming packets and converts this digital data to the analog or digital format used by the PSTN trunk to which gateway 64 is coupled. Since the digital format for voice transmissions over an IP network is often different than the format used on the digital trunks of PSTN 60, gateway 64 provides a conversion between these different digital formats, referred to as transcoding. Gateway 64 also translates between the VoIP call control system and the Signaling System 7 (SS7) protocol or other signaling protocols used in PSTN 60.

For voice transmissions from PSTN 60 to LAN 20, the process is reversed. Gateway 64 takes the incoming voice transmission (in either analog or digital form) and converts it into the digital format used by LAN 20. The digital data is then encapsulated into IP packets and transmitted over LAN 20.

When placing a call to a PSTN telephony device 68 from IP telephony device 22 on LAN 20*a*, the voice or fax signal generated by the user of IP telephony device 22 is digitized and encapsulated, as described above. The packets are then transmitted over LAN 20*a* to gateway 64. If more than one PSTN gateway 64 is coupled to LAN 20*a*, call manager 26*a* determines which gateway 64 is to receive the transmission based on the telephone number (e.g., the North American Numbering Plan (NANP) number) of the PSTN telephony device. Gateway 64 retrieves the IP packets and converts the data to the format (either digital or analog) used by the PSTN trunk to which the gateway is connected. The voice signals are then sent to PSTN telephony device 68 over PSTN 60. This process, and the reverse process, is continued between PSTN 60 and LAN 20*a* through gateway 64 until the call is complete.

Calls can also be made between an IP telephony device located on a LAN 20 and another IP telephony device located on another LAN 20, across WAN 30, or on Internet 40. For example, a call may be placed between IP telephony device 22 connected to LAN 20*a* and IP telephony device 25 connected to LAN 20*b*. As discussed above, the analog voice or fax data is digitized and encapsulated into IP packets at the originating IP telephony device 22. However, unlike communications with telephony devices on PSTN 60, gateway 64 is not needed to convert the IP packets to another format. Instead, a router (or other similar device) directs the packets to the IP address of target IP telephony device 25. IP telephony device 25 then retrieves the data and coverts it to analog form for presentation to the user. Either call manager 26*a* or call manger 26*b* (on LAN 20*b*) may control IP telephony device 25.

When a call is placed to an IP telephony device, for example IP telephony device 22, a call initiation request is first sent to call manager 26*a*. If the originating telephony device is an IP telephony device (e.g., an intra-LAN or inter-LAN IP call), the originating IP telephony device generates the call initiation request and sends the request to call manager 26*a*. If the originating telephony device is a non-IP telephony device, such as PSTN telephony device 68, gateway 64*a* first receives the incoming call from CO 62*a*, and sends a call initiation request to call manager 26*a* indicating the IP telephony device that is being called. In either case, once call manager 26*a* receives the call initiation request, call manager 26*a* sends a signal to IP telephony device 22 offering the call to the telephony device.

If IP telephony device 22 can accept the call (e.g., it is not in use or under a Do Not Disturb instruction from the user), IP telephony device 22 replies to call manager 26*a* that it will accept the call. Upon receiving this acceptance, call manager 26*a* transmits a signal to IP telephony device 22 to cause it to ring. The telephony device's user can then hear the ring and can take the telephony device "off-hook" to receive the call. Taking the telephony device off-hook may include, but is not limited to, picking up a handset, pressing the ringing line's button, pressing a speakerphone button, or otherwise indicating that the telephony device is ready to receive the incoming call. For the purposes of this application, the term "off-hook" is used to generically indicate a condition of a telephony device when it is ready to initiate or receive telecommunication signals.

Once IP telephony device 22 has been taken off-hook, call manager 26*a* instructs IP telephony device 22 and the originating telephony device to begin media streaming to each other. If the originating telephony device is a non-IP telephony device, such as PSTN telephony device 68, this media streaming occurs between IP telephony device 22 and gateway 64. Gateway 64 then transmits the media to PSTN telephony device 68.

One advantage associated with IP telephony devices is their ability to communicate and interact with any other IP device coupled to communication network 10. For example, IP telephony devices may interact and communicate with other IP telephony devices, with non-IP telephony devices, and even with virtual telephony devices. Virtual telephony devices may be implemented as software, firmware and/or hardware on any device on the IP network. For example, call manager 26*a* may contain software for implementing one or more virtual telephony devices. Virtual telephony device software or firmware may also be located on any other network device.

Virtual telephony devices may be logically inserted between two or more IP telephony devices to act as an intermediary between the telephony devices. Once such a relationship is set up, signaling and media streaming that passes through the virtual telephony device may then be modified through address translation or data stream manipulation for various reasons before they are sent on to the destination device. Reasons for such modifications include providing network security, duplicating streams, dynamically redirecting streams, maintaining connections between devices, converting between data formats (e.g., A-Law to μ-Law), and injecting media. One such implementation of a virtual telephony device is as a bridge 28.

Figure 2:
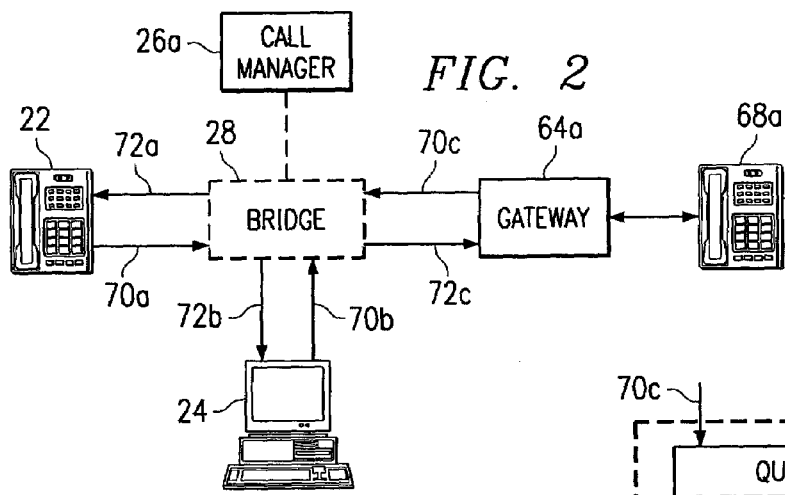
FIG. 2 illustrates a conference call established using a bridge between telephony devices in the communication network of FIG. 1.

FIG. 2 illustrates a conference call established between telephony devices 22, 24, and 64*a* using bridge 28. In the illustrated embodiment, call manager 26*a* generates bridge 28 by executing software stored at the device executing call manager 26*a* (or on any other network device). Bridge 28 acts as an intermediary between telephony devices 22, 24, 64*a* to enable the conference call. Each telephony device 22, 24, 64*a* (a gateway communicating telecommunications to and from PSTN phone 68*a*, for example) streams input media 70 to bridge 28. Bridge 28 mixes the media streaming from telephony devices 22, 24, 64*a*, and then streams the mixed output media 72 to each telephony device 22, 24, 64*a*. In this manner, a conference call is enabled.

It should be understood that bridge 28 may not mix the media streaming from all telephony devices 22, 24, 64*a* for transmission back to telephony devices 22, 24, 64*a*. Instead, bridge 28 may perform echo cancellation by not mixing the input received from a particular telephony device into the output media streaming directed to that particular telephony device. In this case, a separate output stream is mixed for each telephony device 22, 24, 64*a* (containing only the input from the other telephony devices).

A problem arises when mixing the media streaming from various telephony devices if the telephony devices use different payload sizes. Each packet in the media streaming includes a payload and one or more headers. The payload contains the media data, such as digitized voice data. The size of the packet payload depends on the frequency at which the telephony device encapsulates the digitized data into packets. For example, if telephony device 24 uses a twenty millisecond (20 ms) payload size, telephony device 24 sends out a media packet containing 20 ms of voice or video data approximately fifty times per second.

If the payload size of incoming packets from telephony devices 22, 24, 64*a* is not equal, bridge 28 cannot simply mix the payloads and output the result. If bridge 28 was to mix unequal payloads, then the relative timing of the media inputs from telephony devices 22, 24, 64*a* would be disrupted. In order to solve this problem, bridge 28 incorporates a module(s) that converts the incoming media payloads from telephony devices 22, 24, 64*a* into a common size so that bridge 28 can mix the appropriate payloads and output the mixed payloads to telephony devices 22, 24, 64*a*.

Figure 3:
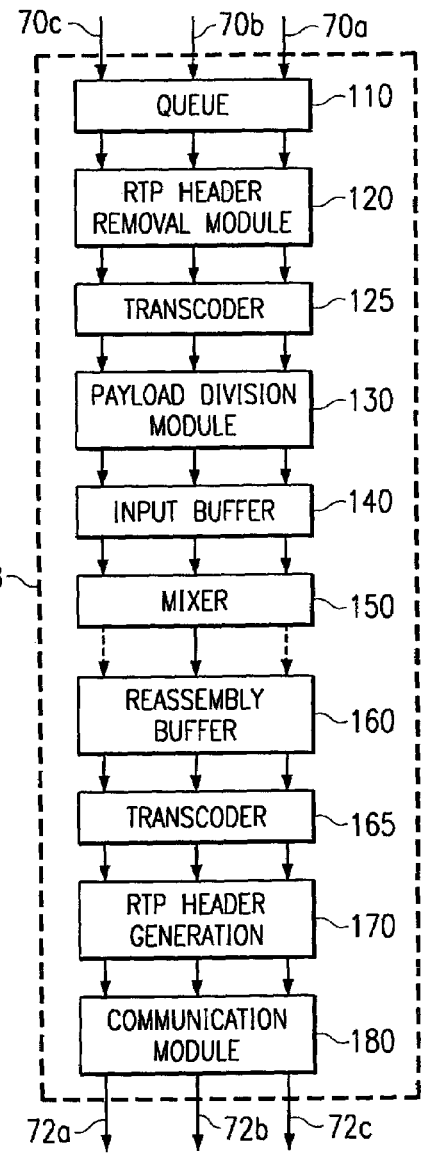
FIG. 3 illustrates an embodiment of the bridge of FIG. 2 enabling the mixing of incoming media packets having different payload sizes.

FIG. 3 illustrates an embodiment of bridge 28 enabling the mixing of incoming media packets having different payload sizes. In the illustrated embodiment, telephony devices 22, 24, 64*a* send media streams 70*a*, 70*b*, 70*c*, respectively, to bridge 28. Bridge 28 may be thought of as an assembly line process where parallel lines of packets are processed simultaneously (e.g., one "assembly line" for each telephony device 22, 24, 64*a*). Each media stream 70*a*, 70*b*, 70*c* is placed in a queue 110. Queue 110 may be a first-in, first-out (FIFO) buffer that holds incoming media streaming packets until they can be further processed by bridge 28.

In addition, if bridge 28 does not receive a packet(s) from a telephony device for a certain interval of time, queue 110 inserts a silence placeholder to fill the position corresponding to each missing packet. Silence placeholders are one method that may be used to maintain the relative order of the packets received from each telephony device 22, 24, 64*a*. If such placeholders are not used, then the next packet received from the "silent" telephony device could jump ahead in the "assembly line" associated with that telephony device (behind the last packet received), and thus be out of order with respect to the packets from the other telephony devices. The silence placeholder complements a silence suppression feature that may be implemented at one or more of telephony devices 22, 24, 64*a*. A silence suppression feature directs a telephony device to transmit only packets containing an audio level above a minimum threshold. Thus, if there is silence (or only background noise), the telephony device does not send a packet in order to conserve network bandwidth.

The packets comprising each media stream 70*a*, 70*b*, 70*c* leave queue 110 when appropriate (e.g., when the next processing step is ready to receive the packets) and enter an RTP header removal module 120, which removes the RTP header from each packet. Note that a UDP/IP protocol stack of bridge 28 removes the IP and UDP headers, and thus they do not need to be removed at this point. RTP header removal module 120 may also check the sequence number in the RTP header of each incoming packet, and may reorder any packets that it receives out of order. Once RTP header removal module 120 has removed the RTP header from a packet, the portion that remains is the payload section containing telecommunication data, such as audio or video data.

Bridge 28 also includes an input transcoder 125. Telephony devices 22, 24, 64*a* encode the telecommunication data that they send to bridge 28*a* using a variety of different encoding formats. Such encoding formats include, but are not limited to, G.711, G.723, G.729 and G.722. Transcoder 125 converts the telecommunication data encoded in these various encoding formats into one common format, such as G.711. Another conversion that may be made is from a-law to u-law encoding. Once transcoder 125 has converted the telecommunication data from each telephony device into a common format, the data can then be mixed.

After transcoding (if appropriate), the payload sections from each telephony device 22, 24, 64*a* are transferred to a payload segmenter 130. Since the payload sections transmitted by each telephony device 22, 24, 64*a* are not all of equal size, payload segmenter 130 divides the payload sections into smaller data segments having a common size (except for remainder and completion segments, which are described below in conjunction with FIGS. 4A and 4B). For example, if telephony device 22 transmits payload sections containing 30 ms of telecommunication data, and telephony device 64*a* transmits payload sections containing 20 ms of telecommunication data, then each of these payload sections can be divided into data segments of 10 ms.

Likewise, payload segmenter 130 divides silence placeholders into silence segments having the same size as the data segments. The number of silence segments that payload segmenter 130 divides a silence placeholder into is dependent upon the size of the incoming payload sections from the associated telephony device. The commonly-sized data and silence segments are transferred to an input buffer 140 in three separate "lines" (again, one line for each telephony device).

Input buffer 140 is a FIFO buffer that aligns the data and/or silence segments in each line relative to the segments in the other lines as they are received from payload segmenter 130. The first segment (whether a data segment or a silence segment) received from a particular telephony device is aligned with the first data or silence segment received from each of the other telephony devices. These corresponding segments form a set. Likewise, the second segment received from a particular telephony device is aligned with the second segment received from each of the other telephony devices. Each set of corresponding data and/or silence segments moves through input buffer 140 in the order received, and is output from input buffer 140, on a first-in, first-out basis, to a mixer 150.

For each set of segments, mixer 150 discards the silence segments and mixes the telecommunication data found in each data segment. The mixed telecommunication data forms an aggregate data segment that has the same length as each incoming segment, for example 10 ms. However, if a set contains only silence segments, mixer 150 replaces the set of silence segments with an aggregate silence segment. Mixer 150 then outputs the aggregate data or silence segment to a reassembly buffer 160.

In a particular embodiment, mixer 150 mixes a separate aggregate data segment for each telephony device. This functionality is indicated by the dashed arrows in FIG. 3. Using this functionality, each device-specific aggregate data segment excludes data received from the telephony device for which it is being mixed. This exclusion of data is a form of echo cancellation that prevents input from a user of particular phone from returning to the user after bridge 28 processes the input. For example, voice inputs from a user of telephony device 22 are not mixed with the voice inputs from telephony devices 24, 64*a* in the aggregate data segments sent to telephony device 22 in order to prevent an echo of the user's voice at telephony device 22.

Reassembly buffer 160 constructs outgoing payload sections to be sent to each telephony device 22, 24, 64a by linking a selected number of aggregate data or silence segments that are successively received from mixer 150. The size of the outgoing payload sections constructed for a particular telephony device may be negotiated through communication between the telephony device and call manager 26a or bridge 28. Alternatively, reassembly buffer 160 may construct an outgoing payload section for a particular telephony device based on the size of the payload sections that the particular telephony device is transmitting to bridge 28. For example, if telephony device 22 sends payload sections containing 30 ms of telecommunication data, reassembly buffer 160 constructs an outgoing payload section for telephony device 22 by linking three aggregate data and/or silence segments of 10 ms each. Likewise, if telephony device 64a transmits payload sections containing 20 ms of data, reassembly buffer 160 constructs outgoing payload sections for telephony device 64a using two aggregate segments.

If an outgoing payload section is constructed using only aggregate silence segments, reassembly buffer 160 discards that outgoing payload section to reduce network traffic. Since such outgoing payload sections contain only silence, they do not need to be transmitted to telephony devices 22, 24, 64a. If necessary, a temporary placeholder may be used to maintain the relative timing of the outgoing payload sections constructed for each telephony device 22, 24, 64a. Discarding silent outgoing payload sections in this manner often provides large savings in network bandwidth since a typical telephone call includes numerous pauses in the conversation and silent periods between spoken words and sentences. Once reassembly buffer 160 has received sufficient data and/or silence aggregate segments to construct an outgoing payload section for a particular telephony device 22, 24, 64a, reassembly buffer 160 forwards the outgoing payload section to an output transcoder 165, if appropriate. As described above, if telephony devices 22, 24, 64a use different encoding formats, input transcoder 125 is used to convert the telecommunication data into a common encoding format. If such a conversion is performed, output transcoder 165 is used to convert the telecommunication data contained in each outgoing payload section back to the encoding format used by the particular telephony device to which it is to be transmitted.

After the outgoing payload sections leave either reassembly buffer 160 or output transcoder 165 (if appropriate), the packets are sent to an RTP header generation module 170. Module 170 adds an RTP header to each outgoing payload section to form an RTP packet. Each RTP header contains a sequence number and a time stamp which the destination telephony device uses to order the incoming RTP packets (a separate series of sequence numbers is used for each telephony device). The RTP packets are then transmitted to a communication module 180, such as a UDP/IP protocol stack, which adds UDP and IP headers to each RTP packet. Communication module 180 then transmits successive IP packets to telephony devices 22, 24, 64a as output media streams 72a, 72b and 72c, respectively.

The various components 110, 120, 125, 130, 140, 150, 160, 165, 170 and 180 of bridge 28 may be implemented using software, firmware and/or hardware. In one embodiment, each component is implemented as a software module executing on a processor. In this embodiment, bridge 28 includes a processor, a memory to store the software modules and data relating to various communication sessions and telephony devices (e.g., preferred payload size and audio encoding format), and a network interface coupling bridge 28 to network 10.

Figure 4A:
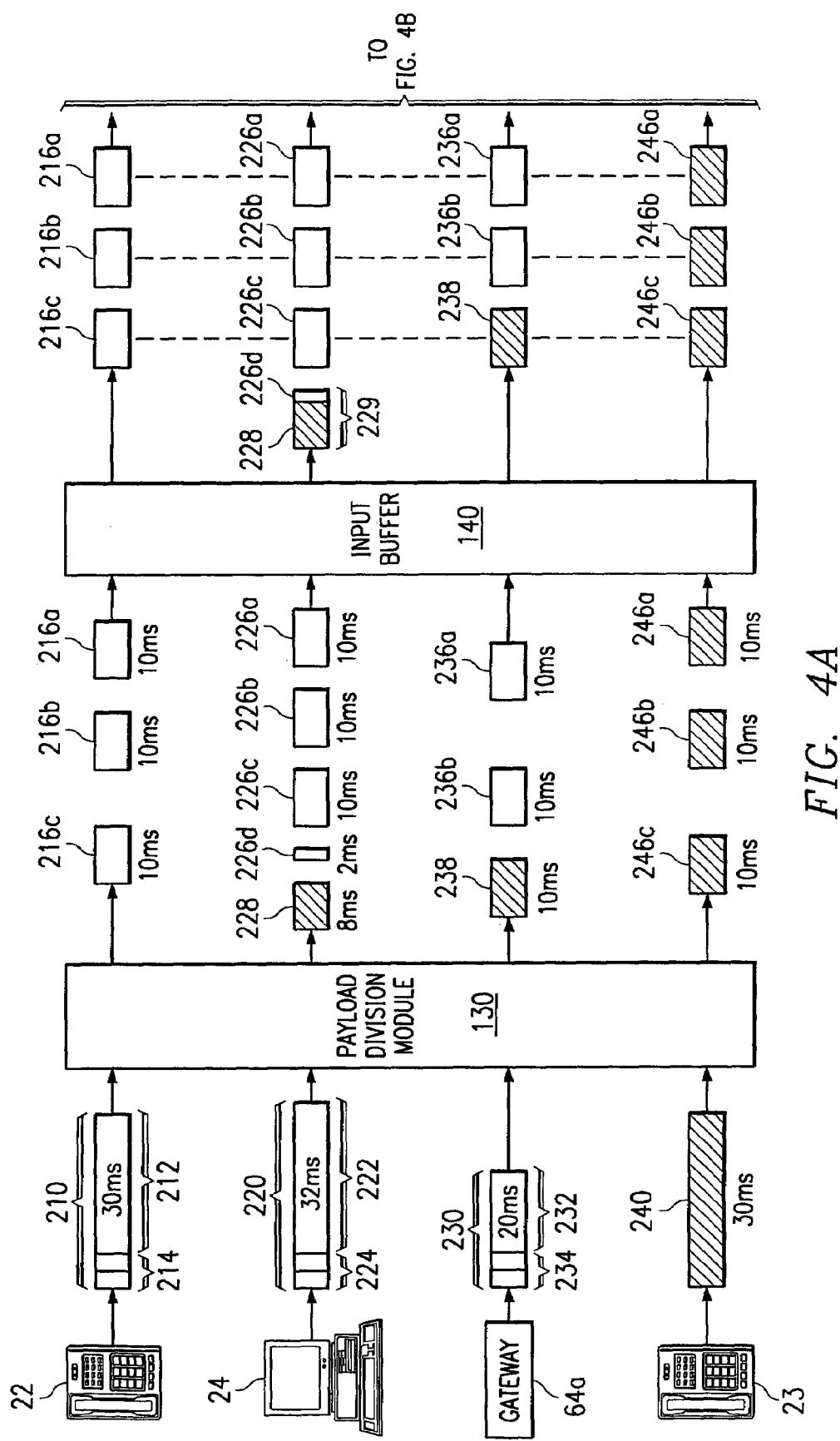
FIGS. 4A and 4B illustrate the progression of an exemplary packet from each telephony device through various components of the bridge of FIG. 3.
Figure 4B:
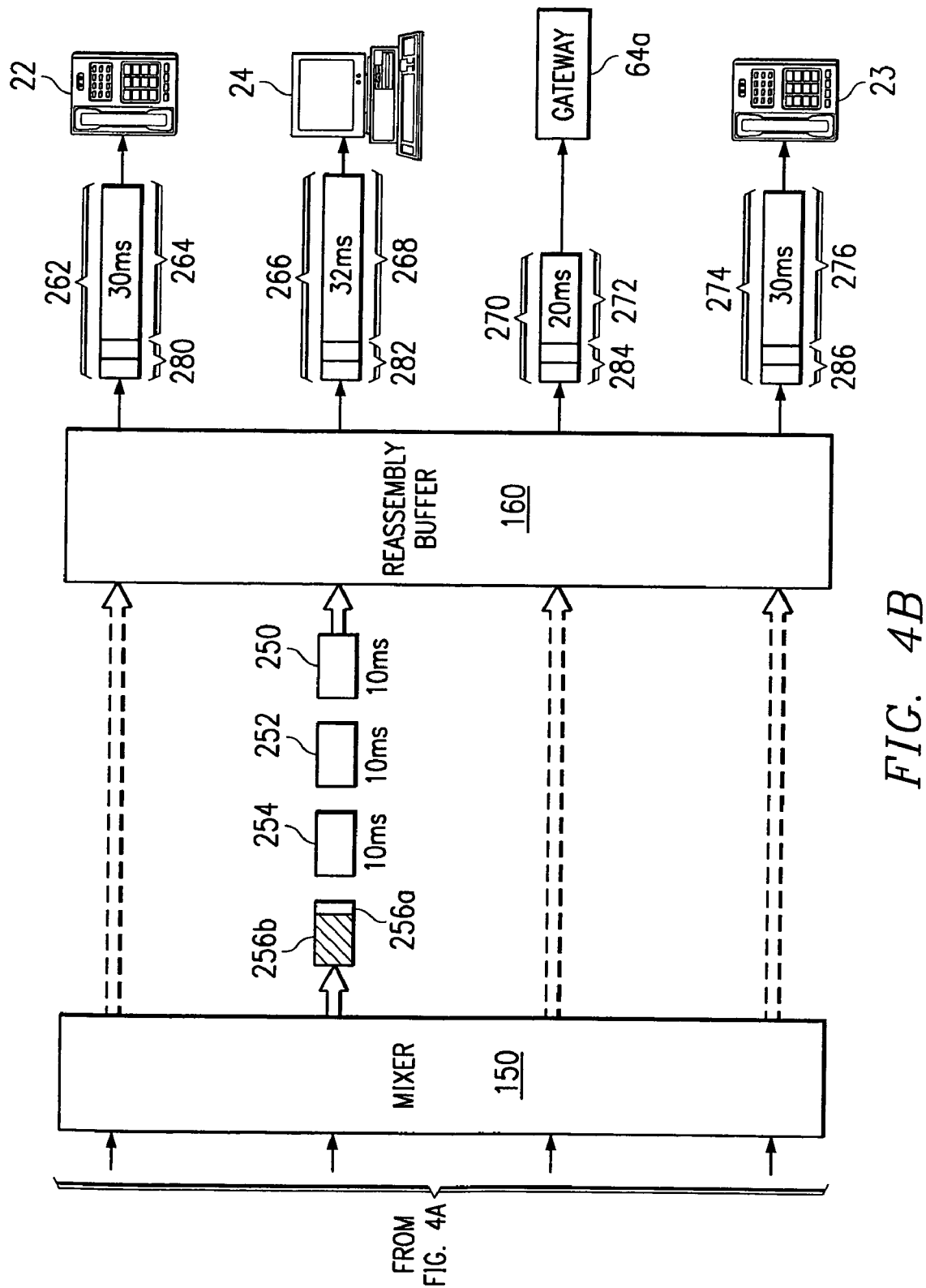

FIGS. 4A and 4B illustrate the progression of an exemplary packet (or a silence placeholder) from each of telephony devices 22, 23, 24, 64a through various components of bridge 28. For simplicity, queue 110, RTP header removal module 120, transcoders 125 and 165, RTP header generation module 170, and communication module 180 are not illustrated. Telephony device 23 has been included to illustrate the processing of silent placeholders.

In the illustrated embodiment, telephony device 22 transmits a media streaming packet 210 having a 30 ms payload section 212. Telephony device 24 transmits a media streaming packet 220 having a 32 ms payload section 222, and telephony device 64a transmits a media streaming packet 230 having a 20 ms payload section 232. Finally, telephony device 23 does not transmit a packet at the time that telephony devices 22, 24, 64a transmit packets 210, 220, 230, respectively, and thus queue 110 inserts a silence placeholder 240. Based on previous transmissions from telephony device 23 (or based on some other source of data), a 30 ms placeholder is used. For the purposes of this discussion, it will be assumed that packets 210, 220, 230 are the first packets sent by telephony devices 22, 24, 64a to bridge 28 in conjunction with a particular conference call. In addition, as described above, bridge 28 processes packets 210, 220, 230 and silence placeholder 240 in parallel.

Once one or more headers 214, 224, 234 of each media streaming packet 210, 220, 230, respectively, have been removed, the remaining payload sections 212, 222, 232 and silence placeholder 240 proceed to payload segmenter 130 for division into segments. In the illustrated embodiment, payload division module 130 uses a 10 ms segment size. However, any other segment size may be used. It is useful to use a common denominator of the various payload sizes as the selected size for the segments. However, in this case the largest common denominator of the payload sizes is 2 ms, and this small segment size generally creates too much overhead to be useful. Therefore, in the illustrated embodiment a segment size of 10 ms is chosen. A segment size of 10 ms typically does not create excessive overhead, and the size of payload sections 212, 232 and silence placeholder 240 are divisible by ten. Although the size of payload section 222 is not divisible by ten, bridge 28 accounts for this using remainder and completion segments, described below. It should also be noted that a segment size greater than one or more of the payload sizes might be used in certain cases. In this case, payload segmenter 130 would serve to add successive payload sections to form a segment, rather than divide a payload section.

For payload section 212, payload segmenter 130 generates three 10 ms data segments 216. Data segment 216a represents the first 10 ms of payload section 212, data segment 216b represents the next 10 ms of payload section 212, and data segment 216c represents the last 10 ms of payload section 212. Likewise, payload segmenter 130 divides payload section 232 of telephony device 64a into two 10 ms data segments 236. Again, data segment 236a represents the first 10 ms of payload section 232 and data segment 236b represents the last 10 ms of payload section 232. Payload segmenter 130 divides silence placeholder 240 into three silence segments 246, each silence segment 246 representing 10 ms of silence.

Unlike payload sections 212 and 232, payload section 222 of telephony device 24 cannot be evenly divided into 10 ms segments. Therefore, payload segmenter 130 generates three full 10 ms segments 226 and a 2 ms remainder segment 226d. Segments 226a, 226b and 226c represent the first, second and third 10 ms segments of payload section 222, respectively.

Remainder segment 226d represents the last 2 ms of telecommunication data in payload section 222.

Segments 216a, 226a, 236a, and 246a enter buffer 140 first. Since there are no other segments in buffer 140 (as noted above, no other packets have been sent), segments 216a, 226a, 236a, 246a proceed through input buffer 140 and are passed to mixer 150 as an aligned set. Mixer 150 discards silence segment 246a and mixes the telecommunication data contained in data segments 216a, 226a, 236a to form an aggregate data segment 250. To perform echo cancellation, mixer 150 may mix data segments 216a and 226a to form a device-specific aggregate segment for telephony device 64a. Likewise, mixer 150 may mix data segments 226a and 236a for telephony device 22, segments 216a and 236a for telephony device 24, and segments 216a, 226a, and 236a for telephony device 23.

Segments 216b, 226b, 236b, 246b likewise proceed through input buffer 140 as a set to mixer 150, which discards silence segment 246b and mixes data segments 216b, 226b, 236b into an aggregate data segment 252 (or into device-specific aggregate segments). Since payload section 232 from telephony device 64a has a size of only 20 ms, there are then no segments remaining from media streaming packet 230. Therefore, a segment 238 representing the first 10 ms of a subsequent packet (or silence placeholder) from telephony device 64a proceeds through input buffer 140 and is aligned with segments 216c, 226c, 246c as a set. Mixer 150 mixes the data segments in the set into an aggregate data segment 254 (or into device-specific aggregate segments).

Since remainder segment 226d containing 2 ms of payload section 222 still remains, the next packet received from telephony device 24 is used to complete remainder segment 226d. Therefore, when a subsequent packet is received from telephony device 24 (or when a silence placeholder is inserted, if appropriate), payload segmenter 130 divides the packet or placeholder into the following segments: a completion segment 228 containing 8 ms of data or silence (to complete remainder segment 226d), two full segments each containing 10 ms of data or silence, and a 4 ms remainder segment. Since payload segmenter 130 has created another remainder segment, a 6 ms completion segment will also be created from the next packet or silence placeholder that is received from telephony device 24.

Payload segmenter 130 continues this process of creating remainder and corresponding completion segments in a recurring cycle. Note that at one point in the cycle, the remainder segment from a payload section will have a size of 8 ms, and thus a completion segment of 2 ms is then created from the next payload section. Payload segmenter 130 will then create three full 10 ms segments from the payload section. Therefore, the entire 32 ms payload section is used, and no remainder segment is left over. The cycle of creating a remainder segment then starts over when the next payload section is received.

After segments 226a-226c from payload section 222 have been sent to input buffer 140, remainder segment 226d is sent to input buffer 140 followed by completion segment 228. Input buffer 140 combines the 2 ms of remainder segment 226d with the 8 ms of completion segment 228 to form a full segment 229. Data segment 229 is then aligned with other data or silence segments from telephony devices 22, 23 and 64a in input buffer 140.

Once mixer 150 creates aggregate segments 250, 252, 254 (or device-specific aggregate segments), each aggregate segment is successively transferred to reassembly buffer 160. Reassembly buffer 160 uses aggregate segments 250, 252, 254 and other successive aggregate segments to construct outgoing payload sections to be transmitted to telephony device 22, 23, 24 and 64a. As described above, the size of the outgoing payload sections constructed for a particular telephony device may be negotiated or based on the size of the payload sections that the particular telephony device transmits to bridge 28.

For example, reassembly buffer 160 constructs a 32 ms outgoing payload section 264 for telephony device 22. Reassembly buffer 160 constructs payload section 264 by linking aggregate data segments 250, 252 and 254. Therefore, the first 10 ms of outgoing payload section 264 comprises the telecommunication data contained in aggregate data segment 250, the next 10 ms comprises the telecommunication data contained in aggregate data segment 252, and the last 10 ms of outgoing payload section 264 comprises the telecommunication data contained in aggregate data segment 254. Again, it should be understood that although aggregate data segments 250, 252 and 254 are described as being linked in the preceding and subsequent description, device-specific aggregate segments generated as described above may alternately be linked to form outgoing payload sections for each device.

Likewise, reassembly buffer 160 constructs an outgoing payload section 272 for telephony device 64a by linking aggregate data segments 250 and 252, and constructs an outgoing payload section 276 for telephony device 23 by linking aggregate data segments 250, 252 and 254. Since an outgoing payload section 268 for telephony device 24 needs to be 32 ms, reassembly buffer 160 constructs outgoing payload section 268 for telephony device 24 by linking aggregate data segments 250, 252, 254 and a 2 ms portion 256a of the data or silence aggregate segment 256 transferred to reassembly buffer 160 after aggregate segment 254. This leaves an 8 ms remainder aggregate segment 256b. Reassembly buffer 160 subsequently links 8 ms remainder aggregate segment 256b with two other full aggregate segments (of 10 ms each) and a 4 ms portion of the following aggregate segment (the 4 ms portion being a completion aggregate segment). As described above in conjunction with payload segmenter 130 and input buffer 140, this process of creating remainder and completion aggregate segments to create 32 ms outgoing payload sections for telephony device 24 continues in a recurring cycle.

After reassembly buffer 160 constructs outgoing payload sections 264, 268, 272, 276, a protocol stack adds appropriate headers 280, 282, 284, 286 to payload sections 264, 268, 272, 276 to form outgoing packets 262, 266, 270, 274, respectively. The protocol stack then communicates packets 262, 266, 270, 274 to telephony devices 22, 24, 64a, 23. The process described in FIGS. 3, 4A and 4B is then continued until telephony devices 22, 24, 64a, 23 complete the conference call.

Figure 5:
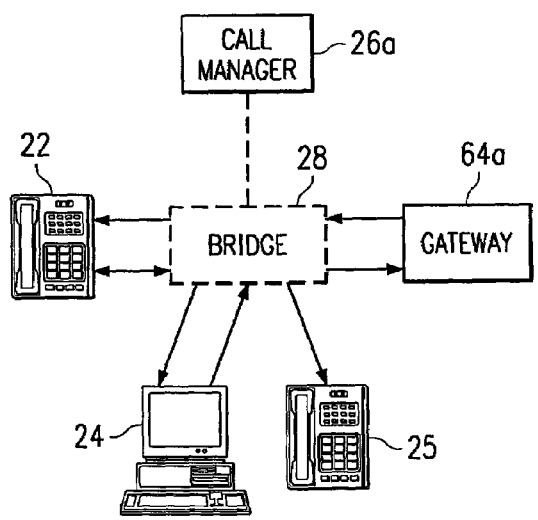
FIG. 5 illustrates the implementation of a silent monitoring feature using a bridge.

Although the implementation of bridge 28 described above is as a facilitator of a conference call between telephony devices, bridge 28 has many other uses. For example, although the embodiments illustrated above have an equal number of incoming and outgoing media streams, this does not have to be the case. FIG. 5 illustrates the implementation of a silent monitoring feature using bridge 28 of FIGS. 4A and 4B. In the illustrated embodiment, bridge 28 constructs outgoing payload sections for a telephony device 25 that is not providing incoming payload sections to bridge 28. Therefore, telephony device 25 silently monitors the call by receiving the mixed media streaming inputs of telephony devices 22, 23, 24, 64a. Telephony device 25 receives packets having any appropriate payload size, and bridge 28 constructs these packets as described above.

In addition, bridge 28 could also be used to translate one or more incoming payload sizes to one or more outgoing payload sizes without mixing the contents of any payloads. This embodiment would operate by dividing the incoming payload sections into segments and then reassembling the segments into a selected payload size(s), as described above. For example, the embodiment described in FIGS. 4A and 4B could operate in the same manner as described above, except that mixer 150 would be removed. Therefore, input buffer 140 would transfer the divided segments directly to reassembly buffer 160.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for enabling communication between a plurality of telephony devices, comprising:
   receiving incoming media packets from each telephony device at a bridge;
   at the bridge, dividing an incoming payload section of each incoming media packet into one or more data segments;
   at the bridge, mixing the data segments from two or more of the telephony devices to create an aggregate data segment, wherein each individual data segment has a first length and wherein the aggregate data segment also has the same first length; and
   at the bridge, constructing an outgoing payload section for one or more of the telephony devices by linking successively generated aggregate data segments.

2. The method of claim 1, wherein receiving incoming media packets from each telephony device comprises receiving incoming media packets comprising audio data.

3. The method of claim 1, further comprising constructing an outgoing payload section for a telephony device from which incoming media packets were not received by linking a selected number of successively generated aggregate data segments appropriate for the telephony device.

4. The method of claim 1, further comprising inserting one or more silence placeholders to fill a time interval during which no incoming media packets are received from a particular telephony device.

5. The method of claim 4, further comprising dividing a silence placeholder into one or more silence segments.

6. The method of claim 5, further comprising aligning a silence segment from a telephony device with a data segment or a silence segment of one or more of the other telephony devices.

7. The method of claim 6, wherein mixing the data segments from two or more of the telephony devices to create an aggregate data segment further comprises:
   ignoring silence segments and mixing the aligned data segments from the two or more telephony devices to form an aggregate data segment; and
   if only silence segments are aligned, replacing the aligned silence segments with an aggregate silence segment.

8. The method of claim 7, wherein constructing an outgoing payload section for one or more of the telephony devices comprises linking a selected number of successively generated aggregate data segments and aggregate silence segments.

9. The method of claim 8, further comprising discarding all outgoing payload sections constructed using only aggregate silence segments.

10. The method of claim 1, wherein dividing an incoming payload section of each incoming packet into one or more data segments comprises dividing a first payload section of a first incoming packet into one or more full segments of equal size and a remainder segment containing the remainder of the first payload section.

11. The method of claim 10, further comprising dividing a second payload section of a second incoming packet received after the first incoming packet into a completion segment, one or more full segments of equal size, and a remainder segment.

12. The method of claim 11, further comprising linking the remainder segment of the first payload section to the completion segment of the second payload section to form a full segment.

13. The method of claim 1, wherein constructing an outgoing payload section for one or more of the telephony devices by linking a selected number of successively generated aggregate data segments comprises constructing a first outgoing payload section for a telephony device by linking one or more full aggregate data segments and a portion of another aggregate data segment, leaving a remainder aggregate data segment.

14. The method of claim 13, further comprising constructing a second outgoing payload section by linking the remainder aggregate data segment to one or more successive full aggregate data segments, and a portion of another aggregate data segment.

15. An apparatus enabling communication between a plurality of telephony devices, comprising:
   a queue operable to receive incoming media packets from the plurality of telephony devices;
   a payload segmenter coupled to the queue and operable to divide an incoming payload section of each incoming packet into one or more data segments;
   a mixer coupled to the payload segmenter and operable to mix the data segments from two or more of the telephony devices to create an aggregate data segment, wherein each individual data segment has a first length and the aggregate data segment also has the same first length; and
   a reassembly buffer coupled to the mixer and operable to construct an outgoing payload section for one or more telephony devices by linking successively generated aggregate data segments.

16. The apparatus of claim 15, further comprising an input transcoder operable to convert data in the incoming payload sections into a common media format.

17. The apparatus of claim 16, wherein the input transcoder is operable to convert audio data in the incoming payload section to G.711 encoded audio data.

18. The apparatus of claim 17, wherein:
   the queue is further operable to insert one or more silence placeholders to fill a time interval during which no incoming media packets are received from a particular telephony device;
   the payload segmenter is further operable to divide a silence placeholder into one or more silence segments; and
   the mixer is further operable to ignore silence segments and mix the data segments from the two or more telephony devices to form an aggregate data segment, and if only silence segments exist, operable to replace the silence segments with an aggregate silence segment.

19. The apparatus of claim 18, wherein the payload segmenter is further operable to:
   divide a first payload section of a first incoming packet into one or more full segments of equal size and a remainder segment containing the remainder of the first payload section; and divide a second payload section of a second incoming packet received after the first incoming packet into a completion segment, one or more full segments of equal size, and a remainder segment.

20. The apparatus of claim 19, further comprising an input buffer coupled to the payload segmenter and operable to link the remainder segment of the first payload section to the completion segment of the second payload section to form a full segment.

21. A communication network, comprising:
a plurality of telephony devices operable to transmit media packets, the media packets each having a payload section including telecommunication data, the payload sections transmitted from at least one of the telephony devices having a different size than the payload sections transmitted from the other telephony devices; and
a bridge, including:
a queue operable to receive incoming media packets from the plurality of telephony devices;
a payload segmenter coupled to the queue and operable to divide an incoming payload section of each incoming packet into one or more data segments;
a mixer coupled to the payload segmenter and operable to mix the data segments from two or more of the telephony devices to create an aggregate data segment, wherein each individual data segment has a first length and the aggregate data segment also has the same first length; and
a reassembly buffer coupled to the mixer and operable to construct an outgoing payload section for one or more telephony devices by linking successively generated aggregate data segments.

22. The communication network of claim 21, wherein the bridge further comprises an input transcoder operable to convert the telecommunication data in the payload sections of the received media packets into a common media format.

23. The communication network of claim 22, wherein the input transcoder is operable to convert audio data in the incoming payload sections to G.711 encoded audio data.

24. The communication network of claim 23, wherein:
the queue is further operable to insert one or more silence placeholders to fill a time interval during which no incoming media packets are received from a particular telephony device;
the payload segmenter is further operable to divide a silence placeholder into one or more silence segments; and
the mixer is further operable to ignore silence segments and mix the data segments from the two or more telephony devices to form an aggregate data segment, and if only silence segments exist, operable to replace the silence segments with an aggregate silence segment.

25. The communication network of claim 21, wherein the payload segmenter is further operable to:
divide a first payload section of a first incoming packet into one or more full segments of equal size and a remainder segment containing the remainder of the first payload section; and
divide a second payload section of a second incoming packet received after the first incoming packet into a completion segment, one or more full segments of equal size, and a remainder segment.

26. The communication network of claim 25, wherein the bridge further comprises an input buffer coupled to the payload segmenter and operable to link the remainder segment of the first payload section to the completion segment of the second payload section to form a full segment.

27. A computer readable medium having stored thereon a computer program that, when executed by a processor, causes the processor to perform the method of:
receiving incoming media packets from a plurality of telephony devices;
dividing an incoming payload section of each incoming media packet into one or more data segments;
mixing the data segments from two or more of the telephony devices to create an aggregate data segment, wherein each individual data segment has a first length and the aggregate data segment also has the same first length; and
constructing an outgoing payload section for one or more of the telephony devices by linking successively generated aggregate data segments.

28. The computer readable medium of claim 27, wherein receiving incoming media packets from each telephony device comprises receiving incoming media packets comprising audio data.

29. The computer readable medium of claim 27, further operable to construct an outgoing payload section for a telephony device from which incoming media packets were not received by linking a selected number of successively generated aggregate data segments appropriate for the telephony device.

30. The computer readable medium of claim 27, further operable to insert one or more silence placeholders to fill a time interval during which no incoming media packets are received from a particular telephony device.

31. The computer readable medium of claim 30, further operable to divide a silence placeholder into one or more silence segments.

32. The computer readable medium of claim 31, further operable to align a silence segment from a telephony device with a data segment or a silence segment of one or more of the other telephony devices.

33. The computer readable medium of claim 32, wherein mixing the aligned data segments from two or more of the telephony devices to create an aggregate data segment further comprises:
ignoring silence segments and mixing the aligned data segments from the two or more telephony devices to form an aggregate data segment; and
if only silence segments are aligned, replacing the aligned silence segments with an aggregate silence segment.

34. The computer readable medium of claim 33, wherein constructing an outgoing payload section for one or more of the telephony devices comprises linking a selected number of successively generated aggregate data segments and aggregate silence segments.

35. The computer readable medium of claim 34, further operable to discard all outgoing payload sections constructed using only aggregate silence segments.

36. The computer readable medium of claim 27, wherein dividing an incoming payload section of each incoming packet into one or more data segments comprises dividing a first payload section of a first incoming packet into one or more full segments of equal size and a remainder segment containing the remainder of the first payload section.

37. The computer readable medium of claim 36, further operable to divide a second payload section of a second incoming packet received after the first incoming packet into a completion segment, one or more full segments of equal size, and a remainder segment.

38. The computer readable medium of claim 37, further operable to link the remainder segment of the first payload section to the completion segment of the second payload section to form a full segment.

39. The computer readable medium of claim 27, wherein constructing an outgoing payload section for one or more of the telephony devices by linking a selected number of successively generated aggregate data segments comprises constructing a first outgoing payload section for a telephony device by linking one or more full aggregate data segments and a portion of another aggregate data segment, leaving a remainder aggregate data segment.

40. The computer readable medium of claim 39, further operable to construct a second outgoing payload section by linking the remainder aggregate data segment to one or more successive full aggregate data segments, and a portion of another aggregate data segment.

* * * * *